July 9, 1929.　　　　L. RONDOLIN　　　　1,720,609
MANUFACTURE OF BISCUITS AND THE LIKE
Filed Aug. 17, 1925　　　2 Sheets-Sheet 1
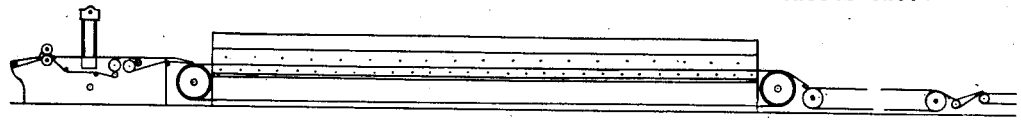
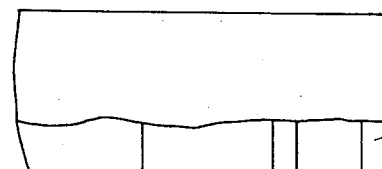
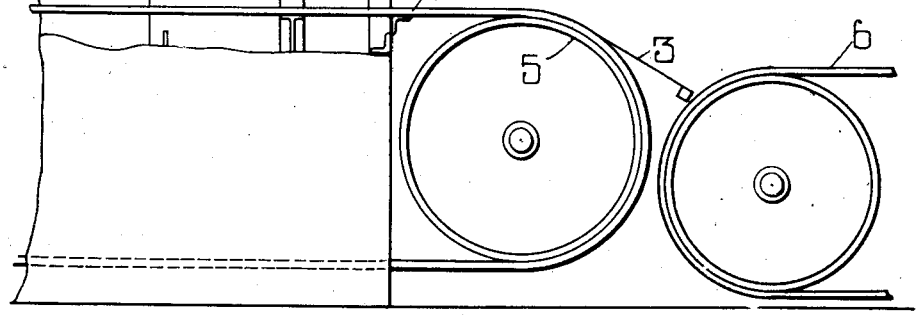
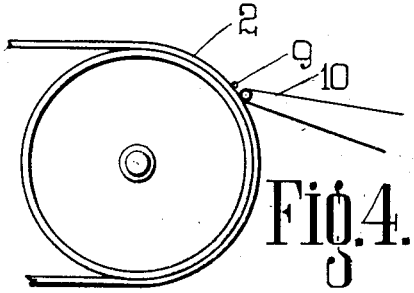
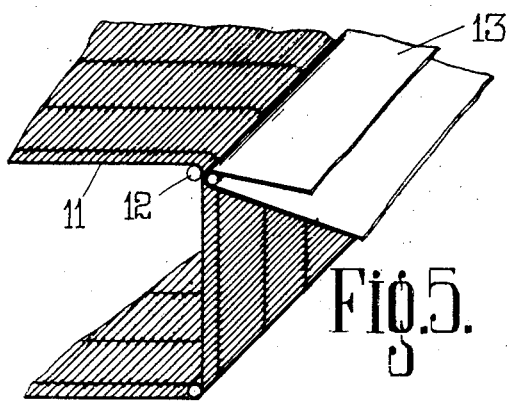
Inventor
Laurent Rondolin
By Dowell & Dowell
Attorneys July 9, 1929.   L. RONDOLIN   1,720,609
MANUFACTURE OF BISCUITS AND THE LIKE
Filed Aug. 17, 1925   2 Sheets-Sheet 2
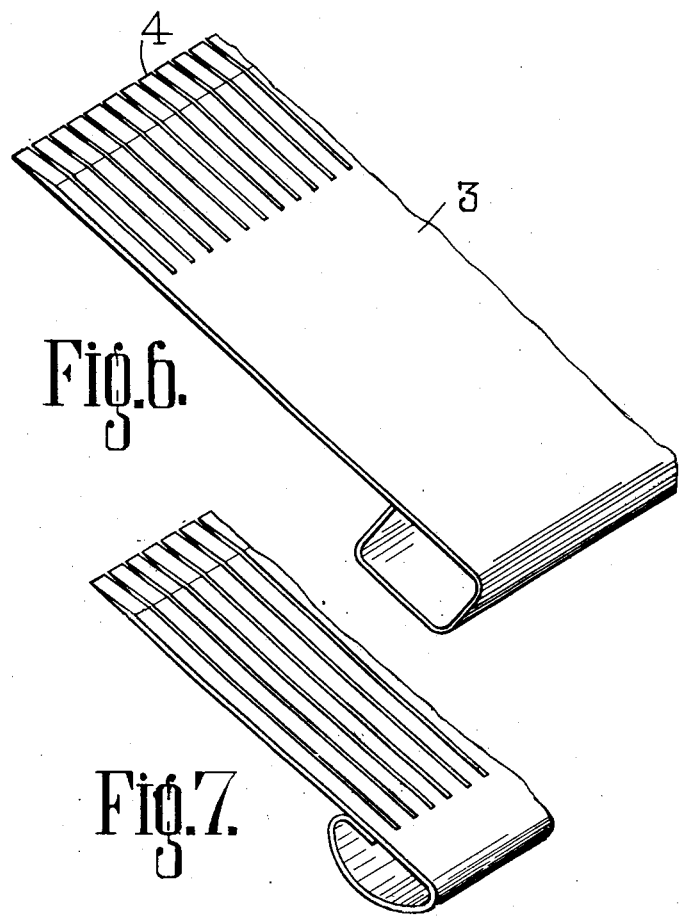
Inventor.
Laurent Rondolin
By Dowell & Dowell
Attorneys Patented July 9, 1929.

1,720,609

UNITED STATES PATENT OFFICE.

LAURENT RONDOLIN, OF LONDON, ENGLAND, ASSIGNOR TO PEEK FREAN & COMPANY LIMITED, OF LONDON, ENGLAND, A BRITISH COMPANY.

MANUFACTURE OF BISCUITS AND THE LIKE.

Application filed August 17, 1925, Serial No. 50,780, and in Great Britain February 10, 1925.

The present invention relates to improvements in the manufacture of biscuits and the like from plastic material, such as dough.

It has been found in the manufacture of certain classes of biscuits, such as those containing fruits or fruit juices, or in which the dough mixture has a high sugar content, that the biscuits are apt to stick upon the baking surface after being baked or heated and can only satisfactorily be removed whilst yet maintaining their integrity, when sufficiently cooled. It is, however, undesirable for reasons of efficiency, to use a conveyor or other device which will be common to the baking chamber and to a sufficient run of cooling space, for the reason that such conveyor will necessarily absorb heat and then re-radiate large quantities of the heat outside the baking chamber which will be lost as far as concerns baking purposes.

According to the present invention, biscuits from plastic dough or dough tending to become adhesive when heated and then cooled, are baked in spaced relationship upon a continuous web conveyor particular to an oven alone, so that heat energy applied to the conveyor will be conserved, in that the conveyor does not pass through long distances through which it can give up heat. The biscuits are then stripped from the conveyor surface while in a hot and plastic condition, by means substantially maintaining their spaced relationship, and will then be received by a second conveyor on which they are cooled and can become set and rigid.

It is desirable in the stripping of the biscuits from the conveyor surface, that their relationship shall be substantially maintained as the biscuits will still be of a plastic or adhesive character and care must be taken that they do not become deformed as a result of their tendency to stick to the baking surface.

Various means can be used for stripping the biscuits whilst in the hot and plastic condition from the oven conveyor. A preferred means is to provide a plurality of stripping fingers bearing intimately upon and capable of accommodating themselves to the surface of the oven conveyor, the biscuits being then passed to a separate conveyor for cooling.

The invention is more particularly described with reference to the accompanying diagrammatic drawings, in which:—

Figure 1 is a general arrangement of a biscuit making and baking machine.

Figure 2 is a diagrammatic view of a baking conveyor and stripping means for passing plastic or adhesive biscuits to a cooling conveyor.

Figure 3 shows a modified form of construction in which the stripping means is in the form of a short conveyor.

Figure 4 is a similar view of a further modification in which the stripping means is in the form of a stretched wire.

Figure 5 is a diagrammatic view showing an alternative form of oven conveyor which in passing over guide rollers at the end of its traverse, will automatically strip itself from the biscuits.

Figures 6 and 7 are perspective detail views of a suitable form of stripping means.

According to the present invention biscuits which are cut, moulded or otherwise formed from plastic dough are deposited upon a flexible web conveyor 2, passing through an oven 1, on which conveyor they are baked while conveyed through the oven. They then pass into contact with a stripping device 3, which in the preferred form shown in Figures 6 and 7, comprises a number of spring fingers or flexible strips 4 in this instance integral with a plate 3. The spring fingers 4 bear on the flexible conveyor 2 as the latter is supported by the roller 5 over which it passes before returning on its lower traverse to the delivery or feed end of the oven, and said spring fingers will be able to fully conform with the irregularities in the surface of said conveyor, so that the hot plastic and adhesive biscuits will be stripped therefrom and will slide down the stripper 3 and pass on to the delivery or cooling conveyor 6 to be cooled thereon, and subsequently delivered for packing.

The stripper 3 may be made out of a single piece of metal bent around a supporting bar which may either be irregular to fit a stripper as shown in Figure 6, or partly cylindrical to support a stripper of the type shown in Figure 7.

In certain cases it may be desirable to use a stripper as shown in Figure 3 in which a stripping conveyor such as 7, has a bight 8 of very acute angle bearing intimately against the oven conveyor 2. This conveyor may, if desired, travel at a slightly greater speed than the conveyor 2 so that the biscuits will be stripped from the surface of the conveyor 2 without being deformed in shape. This conveyor 7 then passes the biscuits to a third conveyor upon which they are cooled.

In the modified arrangement shown in Figure 4 the hot plastic biscuits are stripped by a stretched wire 9, bearing intimately against the surface of the conveyor 2, so that the stripped biscuits can pass directly to a conveyor 10, which itself may be the cooling conveyor.

It is possible to bake certain classes of biscuits on a conveyor of the form shown in Figure 5. This conveyor 11 may be flexed around guide rollers, such as 12 of very small diameter, and where these rolls are of a radius less than the length of the biscuit it will be possible to crack or strip the plastic hot biscuits from the surface at the sudden change of direction of the conveyor 11 from its horizontal flight, so that the biscuits are passed directly to a cooling conveyor 13.

It will be seen that in all these cases, the biscuits are stripped from the flexible web conveyor whilst in a hot and plastic condition, the stripping means in each case being arranged so that the relative spacing of the biscuits upon the oven conveyor as predetermined by the cutting mechanism or delivery conveyors working in conjunction therewith will be substantially maintained upon the cooling conveyor onto which the stripping means delivers the heated biscuits.

I declare that what I claim is:—

1. The method of manufacturing biscuits from dough of a nature becoming adhesive when heated and allowed to cool on the heating surface, which consists in placing small pieces of the dough in spaced relationship laterally along a continuously moving conveyor for baking into biscuits, passing the conveyor with the unbaked biscuits through a baking oven, sequentially stripping the baked biscuits while still hot and plastic from the conveyor along a line transverse thereof after emergence from the oven and depositing the stripped biscuits in the same spaced relationship onto a second continuously moving conveyor for cooling.

2. The method of manufacturing biscuits from dough of a nature becoming adhesive to its baking surface when baked and then allowed to cool thereon, which consists in placing small pieces of the dough in laterally and sequentially spaced relation on an endless continuously moving baking surface passed through an oven, baking the biscuits on said surface while passing through the oven, sequentially stripping the baked biscuits while still hot and plastic from said continuously moving surface along a line transverse thereof immediately on emergence from the oven and directly depositing the stripped biscuits in the same spaced relation onto another continuously moving and delivering surface on which they are allowed to cool.

In witness whereof, I have hereunto signed my name this 30th day of July, 1925.

LAURENT RONDOLIN.